W. B. WINEGAR.
COMBINATION CHAIR.
APPLICATION FILED OCT. 31, 1913.

1,091,994.

Patented Mar. 31, 1914.
3 SHEETS—SHEET 1.

Witnesses

William B. Winegar,
Inventor
by C. A. Snow & Co.
Attorneys

W. B. WINEGAR.
COMBINATION CHAIR.
APPLICATION FILED OCT. 31, 1913.

1,091,994.

Patented Mar. 31, 1914.
3 SHEETS—SHEET 2.

William B. Winegar,
Inventor by C. A. Snow & Co.
Attorneys

Witnesses

W. B. WINEGAR.
COMBINATION CHAIR.
APPLICATION FILED OCT. 31, 1913.
1,091,994.
Patented Mar. 31, 1914.
3 SHEETS—SHEET 3.
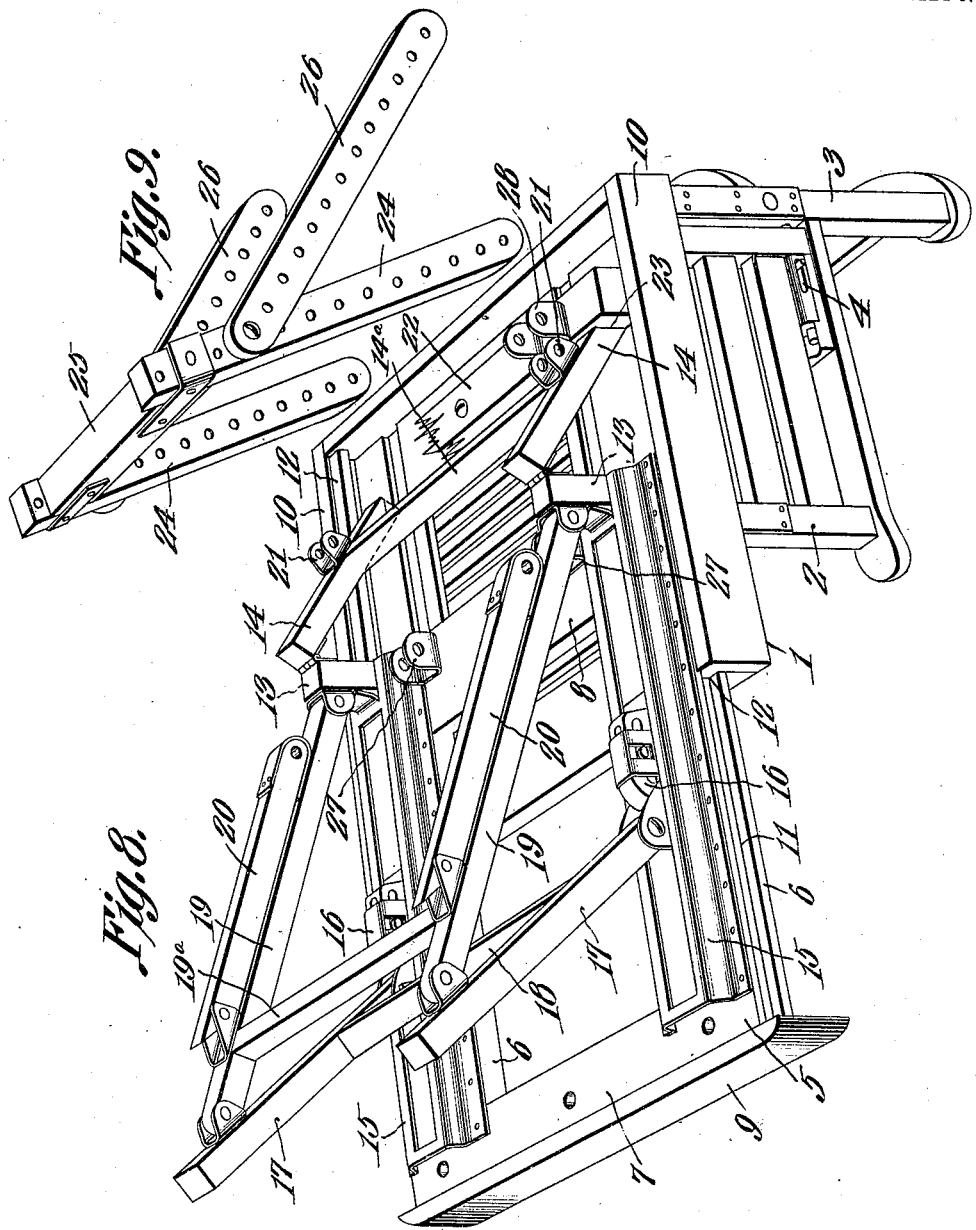
Witnesses
William B. Winegar,
Inventor
by C. A. Snow & Co.
Attorneys

UNITED STATES PATENT OFFICE.

WILLIAM B. WINEGAR, OF HANNIBAL, MISSOURI.

COMBINATION-CHAIR.

1,091,994. Specification of Letters Patent. Patented Mar. 31, 1914.

Application filed October 31, 1913. Serial No. 798,495.

*To all whom it may concern:*

Be it known that I, WILLIAM B. WINEGAR, a citizen of the United States, residing at Hannibal, in the county of Marion and State of Missouri, have invented a new and useful Combination-Chair, of which the following is a specification.

The present invention appertains to a combination chair, and aims to provide a unique structure of that character, which may be adapted for divers purposes.

It is the object of the present invention to provide a novel and improved chair structure, which will enable the device to be employed as a window seat or platform, as an ordinary chair, as a low chair, as a swing seat, and as a bench or table.

It is also within the scope of the invention to provide a peculiar construction and assemblage of parts, to carry out the results desired in a highly desirable and practical manner, the present structure being comparatively simple, and inexpensive, as well as being simple, convenient and efficient in its use.

With the foregoing general objects outlined, and with other objects in view which will be apparent as the nature of the invention is better understood the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1:
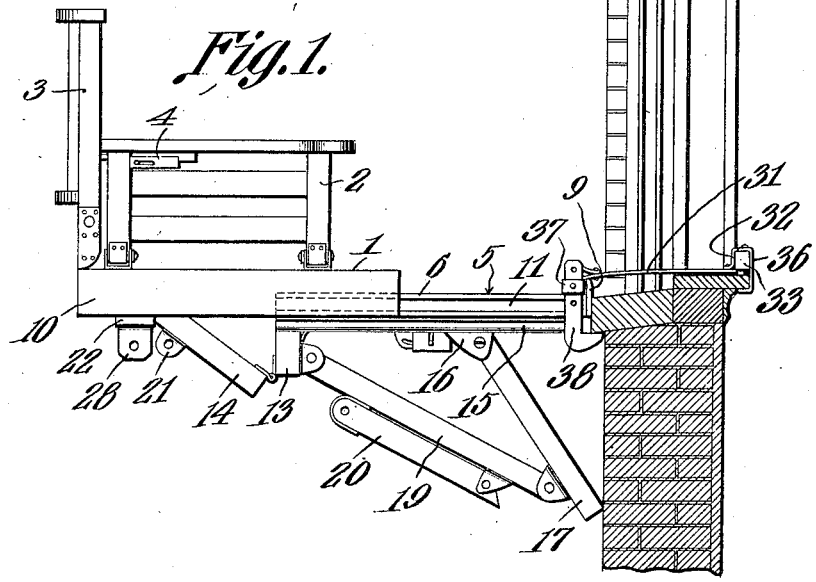
Figure 2:
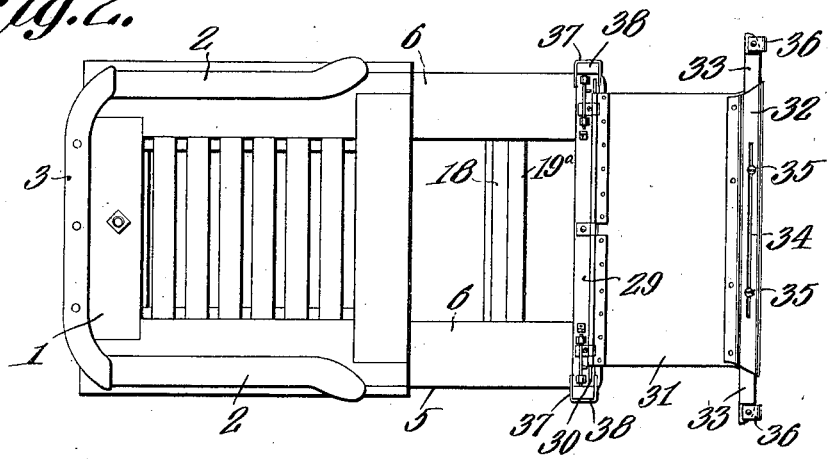
Figure 3:
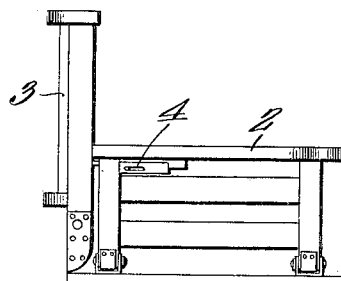
Figure 4:
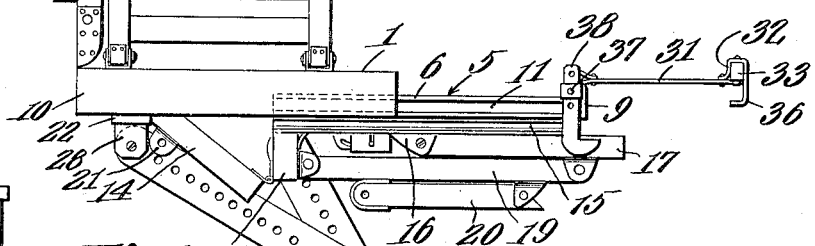
Figure 4:
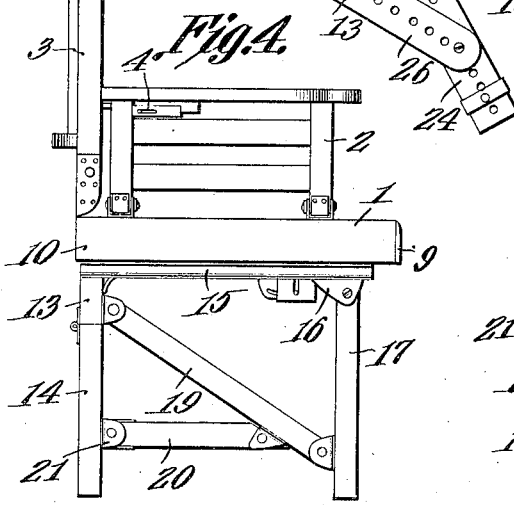
Figure 5:
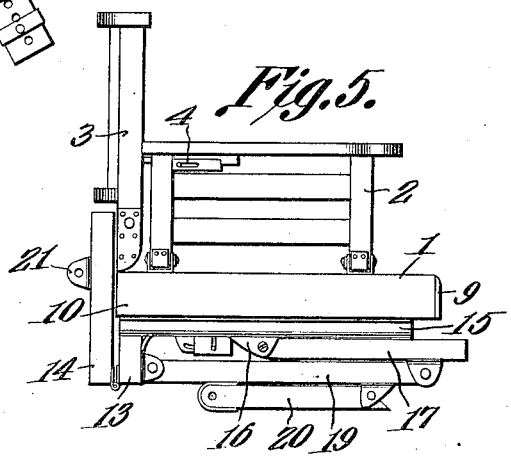
Figure 6:
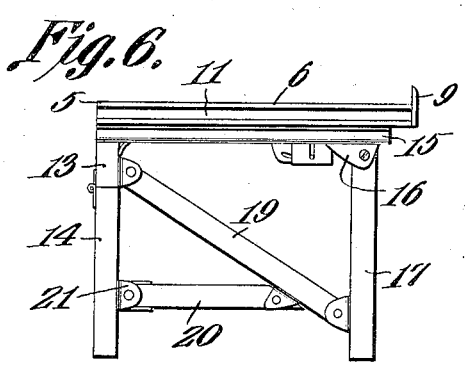
Figure 7:
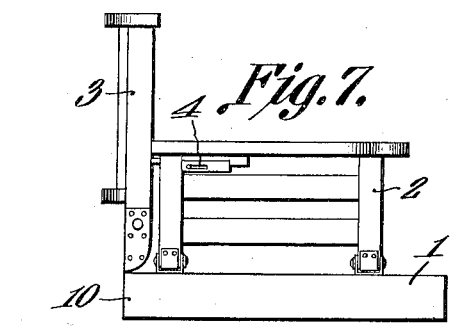

Figure 1 is a side elevation of the device, arranged as a window seat or platform, and as in use. Fig. 2 is a plan view of the parts depicted in Fig. 1. Fig. 3 is a view similar to Fig. 1, illustrating certain of the parts folded together, and a supplemental or auxiliary means for bracing the device. Fig. 4 is a side elevation of the device arranged as a chair. Fig. 5 is a similar view of the device arranged as a low chair. Fig. 6 is a side elevation of that portion of the device which forms the table or bench. Fig. 7 is a side elevation of that portion of the device forming a porch swing, or the like. Fig. 8 is an inverted perspective view of the device, portions being broken away. Fig. 9 is a perspective view of the supplemental or auxiliary bracing structure.

In carrying out the present invention, there is provided a suitable seat 1 having the sides 2 hinged thereto, the sides embodying suitable arms. A back 3 is also pivoted to or fulcrumed upon the seat 1, the sides 2 being equipped with latches or equivalent devices 4 engageable with the back 3 to maintain the sides and back in erect position when unfolded it being apparent that the sides and the back may be folded upon the seat when the seat is out of use, for the purpose of compactly carrying or storing the said parts. In connection with the said seat structure, there is provided a rectangular frame 5 forming a base for the seat 1, the frame 5 including the side rails 6, the front beam or bar 7 connecting the forward ends of the rails 6, and the rear bar or beam 8 connecting the rear ends of the said rails. A face plate 9 is preferably secured to the forward cross bar 7, so as to extend above the upper face of the frame 5.

The seat 1 is slidable upon the frame 5, the side edges of the seat 1 being provided with depending guides 10, between which the side rails 6 of the frame 5 are slidable, the side rails 6 being provided with grooves 11, with which the tongues 12 of the guides 10 are engaged. It will thus be evident that the seat 1 and the frame 5 are slidable forwardly and rearwardly with respect to one another, but are constrained against lateral sideward movements.

The frame 5 carries the legs, as will presently appear. The rear legs embody the stub or butt sections 13 secured rigidly to the rear corners of the frame 5, and the free sections 14 hinged or pivoted to the stub sections 13, in order that the sections 14 may be swung rearwardly and in order that when the sections 14 are swung in alinement with the sections 13, they will be limited in forward movement. The free sections 14 are preferably connected by a rung 14ª, as seen in Fig. 8.

Secured to the bottom of the rails 6 are the guides or slideways 15, in which slides 16 are disposed, the front legs 17 being pivoted to the respective slides 16. The legs 17 are preferably connected by a rung 18, and the slides 16 are provided with any suitable means for locking them in position with respect to the guides or rails, but inasmuch as the particular means employed for locking the slides in position is of no particular moment with respect to the remaining structure, the same need not be illustrated or described in detail.

Braces 19 are pivoted to the front legs 17, intermediate the ends of the said legs or adjoining the lower ends of the said legs and have their other ends pivoted to the stubs 13, the braces 19 at the two sides being preferably connected by a rung 19ª. To the braces 19 are pivoted struts 20 which have their free ends arranged to engage the ears 21 carried by the free end sections 14 of the rear legs, the free ends of the struts 20 being designed to be secured between the respective ears 21, by means of suitable bolts or other securing members, as will be readily understood.

A buttress bar 22 is secured to the bottom of the seat 1 between the guides 10, and adjoining the rear end of the seat, the said buttress bar 22 having the forward sockets 23 adapted to receive the free ends of the sections 14 of the rear legs under such conditions as will hereinafter more fully appear.

The supplemental or auxiliary bracing structure embodies a pair of bars 24, connected at one end by means of a yoke or cross piece 25, and having braces 26 adjustably and pivotally connected thereto. Depending ears 27 are carried by the rear end of the frame 5, for the pivotal engagement of the free ends of the bars 24, while similar ears 28 are carried by the buttress bar 22 for the pivotal engagement of the braces 26, as will hereinafter more fully appear.

In order to attach the frame 5 to the sill or lower end of the window frame or casing, there is provided an attachment for the forward cross bar 7 of the said frame, and which comprises the following essentials. The attachment embodies a bar or cleat 29 which is adapted to be bolted or otherwise secured upon the cross bar or forward end 7 of the frame 5, and which has mounted thereon a rod 30. A sheet metal apron 31 has one edge portion engaged to the rod 30, to pivotally connect the said apron to the cleat 29, the opposite edge of the apron being formed into a guide 32, the terminal portions of which receive the slide bars 33. The guide 32 is preferably provided with a longitudinal slot 34, while the slide bars 33 carry screws or clamping members 35 working within the slot to permit the bars 33 to be locked in any adjusted positions desired. The bars 33 are provided at their remote or outer ends with the depending hooks 36, while the terminals of the cleat 29 are provided with straps or clips 37 forming guides through which the shanks of sill engaging hooks 38 are slidable or adjustable, the shanks of the hooks 38 being locked in adjusted positions in any well known manner.

In employing the present device in the capacity of an ordinary chair, as seen in Fig. 4, the seat 1 and the base frame 5 are telescoped together so that the frame will be housed underneath the seat, and the struts 20 are attached to the free sections 14 of the rear legs, so as to brace the front and rear legs, the slides 16 having been slid forward to bring the front legs 17 vertical. With the parts thus arranged, the device will provide a chair, which may be employed in the manner of an ordinary chair. The plate 9 is designed to fit snugly against the forward end of the seat 1, to give a finished appearance thereto.

To convert the device into a low chair, the struts 20 are detached from the rear leg sections 14, and the slides 16 are slid rearward along the guides 15, which will bring the front legs 17 against the guides 15, as seen in Fig. 5, and which will bring the braces 19 against the bottom edges of the legs 17. The free sections 14 of the rear legs may be swung rearwardly and upwardly against the rear end of the seat 1, and the struts 20 may be swung upwardly against the braces 19. The struts 20, braces 19 and legs 17, thus form a compact support for the seat. It will be evident, at this point, that when the underlying parts having been folded as illustrated in Fig. 5, the sides and back of the seat may also be folded thereon to provide for the compact carrying shipping or storage of the device.

As seen in Figs. 6 and 7, the leg structure and the seat structure are slid out of engagement, in order that the former may serve as a table or bench, and in order that the latter may serve as a seat for a swing or the like, as will be obvious.

To convert the device into a window seat or platform, for cleaning or repairing a window from the outside, the seat 1 and the frame 5 are first slid apart, and the window frame engaging attachment is applied to the frame 5, the cleat 29 being secured on the forward end of the frame 5, as above intimated. The free rear leg sections 14 are then swung rearwardly in order that the free ends may be engaged within the sockets 23 of the buttress bar 22, the seat and frame being sufficiently separated to permit such an action, and then being slid together to force the free ends of the sections 14 into the said sockets, thus bracing the stubs 13 against rearward movement under the strains to which they are subjected. The apron 30 may be readily placed over the sill or lower end of a window frame, as seen in Fig. 1, which will permit the bars 33 to be extended or projected beyond the jambs, to anchor the device in place, the hooks 33 engaging the window frame to assist in the said anchoring function. The hooks 38 are adjusted to engage under the window sill, so as to lock the device against upward movement, and the slides 16 are then slid in order to swing the lower ends of the legs 17 against the wall of the building, to brace the seat against depression.

With the device thus applied to the window frame and wall of a building, it will be apparent that the seat will be supported in a substantial manner, to permit of cleaning the window from the outside, to permit the replacing of window panes without removing the sashes, to permit of putting up or removing awnings, and the like. The apron 31 will permit the sashes to be slid close to the sill, without interference, which is highly desirable.

It is evident that the strain transmitted to the legs 17 due to the weight of the occupant, will be transmitted partially to the braces 19, thence to the stubs 13, and thence to the sections 14, so that the entire structure will be substantial.

Under certain conditions, where there is a ledge or projecting portion upon the wall below the window, the legs 17 can not be employed, as illustrated in Fig. 1. To overcome this disadvantage, there has been provided the supplemental or auxiliary bracing structure, as above described, and which is employed as follows. The legs 17, braces 19 and struts 20 are folded together, as seen in Fig. 3, and the bars 24 and braces 26 are attached to the ears 27 and 28, respectively. Then, by properly adjusting the bars 24 and braces 26, with respect to each other, the bars 24 may be properly positioned to engage the ledge or projection, so as to effectively support or brace the seat.

The buttress bar 22 is detachably engaged to the bottom of the seat, by means of bolts or other securing members, in order that when the seat and the seat frame are to be telescoped together, the buttress bar may be detached to permit of such action.

The present device may be employed in divers capacities, as will be apparent from the foregoing, taken in connection with the drawings, and it is also evident that the device may be compactly collapsed or folded when desired. The other advantages of the present structure will be obvious, without further comment, it being noted that the objects aimed at have been carried out satisfactorily by the provision of the structure above disclosed.

Having thus described the invention, what is claimed is:—

1. In a device of the character described, a seat frame, front legs adjustably and pivotally connected thereto, rear leg sections pivotally connected to the said frame, braces terminally pivoted to the front legs and seat frame, and struts pivotally connected to the braces and attachable to the rear leg sections.

2. In a device of the character described, a seat frame, adjustable members carried by the side portions thereof, front legs pivotally connected to the adjustable members, rear legs embodying stubs secured to the said frame, and free sections hinged to the stubs, braces terminally pivoted to the said stubs and front legs, and struts pivotally connected to the braces and attachable to the free sections of the rear legs.

3. In a device of the character described, a frame, a seat slidable thereon, window casing engaging means attachable to the frame, front legs carried by the frame engageable with the wall of a building, rear legs embodying stubs secured to the said frame and free sections hinged to the said stubs, and means carried by the seat for engaging the free ends of the said free rear leg sections.

4. In a device of the character described, a frame, a seat slidable thereon, means attachable to the said frame for engaging over the lower end of a window casing, front legs adjustably and pivotally connected to the said frame, rear legs embodying stubs secured to the said frame and free sections hinged to the stubs, braces terminally pivoted to the front legs and the stubs, struts pivotally connected to the braces and attachable to the said free rear leg sections, and means for engaging the free ends of the said free rear leg sections to the seat.

5. In a device of the character described, a seat frame, front legs carried thereby and arranged to engage a building wall, and a window casing engaging attachment for the said frame embodying a cleat attachable to the frame, means carried by the terminals of the cleat for engaging a window sill, an apron pivotally connected to the cleat adapted to pass over the window sill, and means carried by the free portion of the apron for engaging over the inner side of the window casing.

In testimony that I claim the foregoing as my own, I have hereto affixed my signature in the presence of two witnesses.

WILLIAM B. WINEGAR.

Witnesses:
 MELVIN MARSHALL,
 OSCAR HAWKINS.